US007411195B2

(12) United States Patent
Narasako et al.

(10) Patent No.: US 7,411,195 B2
(45) Date of Patent: Aug. 12, 2008

(54) HUMAN BODY DETECTION DEVICE AND ELECTRONIC EQUIPMENT USING THE SAME

(75) Inventors: Seiichi Narasako, Kashihara (JP); Hideo Iijima, Nara-ken (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 274 days.

(21) Appl. No.: 10/891,139

(22) Filed: Jul. 15, 2004

(65) Prior Publication Data

US 2005/0061979 A1 Mar. 24, 2005

(30) Foreign Application Priority Data

Jul. 18, 2003 (JP) .......................... P2003-276621

(51) Int. Cl.
*G01J 5/12* (2006.01)

(52) U.S. Cl. .................................................. 250/338.3

(58) Field of Classification Search ............. 250/338.3, 250/339.11, 341.1, 339.14, 341.8, 342
See application file for complete search history.

(56) References Cited

U.S. PATENT DOCUMENTS 4,745,284 A * 5/1988 Masuda et al. ........... 250/338.3
5,489,891 A * 2/1996 Diong et al. ................ 340/567
5,585,625 A * 12/1996 Spies ......................... 250/221
5,670,943 A * 9/1997 DiPoala et al. .............. 340/567
5,751,406 A * 5/1998 Nakazawa et al. ......... 356/3.03
5,877,688 A * 3/1999 Morinaka et al. ........... 340/584
5,887,688 A 3/1999 Ploetz et al.
5,986,265 A * 11/1999 Kim et al. ................ 250/338.3
7,119,887 B2 * 10/2006 Mizuo et al. ............... 356/5.01
7,330,241 B2 * 2/2008 Yamaguchi ................ 356/4.01
2002/0056806 A1 * 5/2002 Bechtel et al. ........... 250/214.1
2006/0087640 A1 * 4/2006 Yamaguchi ................ 356/4.01

FOREIGN PATENT DOCUMENTS

| | | | |
|---|---|---|---|
| DE | 44 00 664 | A1 | 3/1995 |
| DE | 44 00 664 | A1 | 8/1995 |
| EP | 1 114 756 | A2 | 7/2001 |
| JP | 8-338880 | A | 12/1996 |
| JP | 10-63959 | A | 3/1998 |

(Continued)

*Primary Examiner*—David P. Porta
*Assistant Examiner*—David S Baker
(74) *Attorney, Agent, or Firm*—Birch, Stewart, Kolasch & Birch, LLP

(57) ABSTRACT

The human body detection device comprises a pyroelectric-type sensor 7 for detecting presence of a human body and an infrared distance-measuring sensor 2 for detecting a distance to a human body H detected by the pyroelectric-type sensor 7 in combination. The infrared distance-measuring sensor 2 is provided with a plurality of infrared-ray emitting devices 3-0, . . . , 3-4 arranged in various directions of infrared-ray emission I1 for covering the whole detection range of the pyroelectric-type sensor 7. There are also provided a light receiving surface for making infrared rays I1' reflected by a detection object H incident thereon and position sensing devices 4 for outputting a signal indicating a distance to the object H according to a position of the incident light on the light receiving surface. The position sensing device 4 corresponding to a plurality of the infrared-ray emitting devices are housed in one housing 20. This human body detection device is small and low-cost.

10 Claims, 11 Drawing Sheets

FOREIGN PATENT DOCUMENTS

| | | | |
|---|---|---|---|
| JP | 11-25368 | A | 1/1999 |
| JP | 11-120451 | A | 4/1999 |
| JP | 11-193565 | A | 7/1999 |
| JP | 2001-318163 | A | 11/2001 |
| JP | 2003-195428 | A | 7/2003 |

* cited by examiner

HUMAN BODY DETECTION DEVICE AND ELECTRONIC EQUIPMENT USING THE SAME

This Nonprovisional application claims priority under 35 U.S.C. §119(a) on Patent Application No. P2003-276621 filed in Japan on Jul. 18, 2003, the entire contents of which are hereby incorporated by reference.

BACKGROUND OF THE INVENTION

The present invention relates to human body detection devices, and more particularly to a device which is composed of a pyroelectric-type sensor for detecting the presence of a human body and an infrared distance-measuring sensor for computing a distance to a human body in combination.

The present invention further relates to electronic equipment which is provided with the human body detection device described above.

The expression "electronic equipment" as used herein broadly denotes devices which execute electric processing using an output outputted from a human body detection device.

In recent years, a device composed of a pyroelectric-type sensor for detecting the presence of a human body and an infrared distance-measuring sensor (referred to as "human body detection device") has been suggested in order to detect a human body without the need for physical contact between a human body and the device. A pyroelectric-type sensor detects not a stationary body itself but the heat rays (far infrared rays) emitted from the body and thus has a merit that it can sense the presence of a human body. While the pyroelectric-type sensor has a wide angle of field (approx. ±50 degree horizontally) and a long detection distance (up to 5 meter), it cannot detect a distance to and a direction of a human body. On the other hand, an infrared distance-measuring sensor, which emits near infrared rays from an infrared-ray emitting device, detects reflected light beams from a detection object using a position sensing device (PSD). While the infrared distance-measuring sensor has a narrow angle of field (a few degree), it can detect a distance to a detection object, being hardly affected by the colors of the object (the clothing a human body wears). Therefore, combination of the pyroelectric-type sensor and the infrared distance-measuring sensor allows detection of not only the presence of a human body but also a distance to and a direction of a human body (see, e.g., JP H08-338880A).

FIG. 1A is an overhead view schematically showing a conventional human body detection device 100 and FIG. 1B is a front view schematically showing the interior construction of the conventional human body detection device 100. As shown in FIG. 1B, the human body detection device 100 is provided with a pyroelectric-type sensor 101 for detecting the presence of a human body and a plurality of infrared distance-measuring sensors 102-0, 102-1, 102-2, 102-3 and 102-4 (hereinafter collectively referred to as 102) for detecting a distance to a detection object (a human body) in a body casing 150. Each of the infrared distance-measuring sensors 102, being independently and equivalently constituted, is provided with an infrared-ray emitting device (LED) 103, a position sensing device (PSD) 104 and an integrated circuit (IC) 109 in a housing 108. The infrared distance-measuring sensors 102 are arranged in various directions for measuring a distance so that the plural sensors cover the whole detection range of the pyroelectric-type sensor 101. As shown in FIG. 1A, converging lenses 105 and 106 are arranged on a front surface of the casing 150, each of the lenses corresponding to the LEDs 103 and the PSD 104. Near infrared rays emitted from each of the LEDs 103 reach a detection object H through the corresponding converging lens 105, and enter a light receiving surface of the PSD 104 through the converging lens 106. The PSD 104 outputs a signal showing a distance up to the detection object H based on a position on the light receiving surface where the reflected light beams enter.

As shown in FIG. 2, the pyroelectric-type sensor 101 contains a sensor part 101*a* and a signal processing circuit 101*b* for processing an output signal from the sensor part 101*a*. Although only one distance-measuring sensor 102-0 is shown in detail in FIG. 2, each of the distance-measuring sensors 102 contains an LED driving circuit 103B for driving each of the LEDs 103, a signal processing circuit 104B for processing an output from the PSD 104, and a resistor 104C for adjusting sensitivity (103B, 104B and 104C correspond to IC 109 in FIG. 1). The body casing 150 is also provided with a constant-voltage circuit 130 for supplying a constant voltage with each of the distance-measuring sensors 102 and a control circuit 140 for controlling each of the distance-measuring sensors 102.

The pyroelectric-type sensor 101 is always set to an operational state. When a detection object (shown as a human body H in FIG. 1A) exists within a prescribed range (a detection range) from the pyroelectric-type sensor 101, the pyroelectric-type sensor 101 detects far infrared rays emitted from the human body, and outputs a detection signal. According to the detection signal, a distance measuring operation of the distance-measuring sensor 102 is started by a control of the control part 140. Ordinarily, distance measuring operations are intermittently repeated by 102-0, 102-1, 102-2, 102-3 and 102-4 in order. When the distance-measuring sensors 102 detect a distance to a detection object during the operation, a position of a human body relative to the human body detection device 100 is specified based on a direction and a distance of the human body.

However, in the case of the human body detection device 100 in which a plurality of distance-measuring sensors 102 independently composed in respective housing 108 is used, the whole device is necessarily of a large size, resulting in a restriction in use such that the device cannot be mounted on a small-sized equipment. Additionally, the device becomes expensive due to the larger number of its parts.

SUMMARY OF THE INVENTION

Accordingly, an object of the present invention is to provide a human body detection device which is small and low-cost.

It is another object of the present invention to provide electronic equipment using such a human body detection device.

In order to achieve the above object, there is provided a human body detection device which comprises a pyroelectric-type sensor for detecting presence of a human body and an infrared distance-measuring sensor for detecting a distance to the human body in combination, the infrared distance-measuring sensor comprising:

a plurality of infrared-ray emitting devices which are arranged in various directions of infrared emission so as to cover a detection range of the pyroelectric-type sensor; and a position sensing device which has a light receiving surface for making infrared rays reflected by the detection object incident thereon and which outputs a signal indicating a distance to the detection object according to a position of the incident light on the light receiving surface, wherein a plurality of position sensing devices corresponding to the infrared-ray emitting devices are housed in one housing.

The expression "to cover a detection range" as used herein means that infrared rays reach the whole detection range of a pyroelectric-type sensor.

The expression "a housing" as used herein means not a housing composed of a plurality housings, but one composed of a continuous material being unseparatable or undividable.

According to the present human body detection device, the pyroelectric-type sensor detects the presence of a detection object (a human body) by detecting far infrared rays emitted from the human body when the body exists within a detection range. The infrared distance-measuring sensor emits infrared rays from, for example, each infrared-ray emitting device sequentially at short intervals. When the body exists within a detection range, the infrared rays emitted in the direction are reflected by the detection object, and the reflected light beams from the detection object enter the light receiving surface of the PSD. Therefore, a direction where the detection object exists can be detected according to the emitting direction of the infrared rays. The PSD outputs a signal indicating a distance to the detection object according to the entering position of the reflected light on the light receiving surface. Thus the human body detection device can detect not only presence of a human body but also a distance and a direction of a human body.

The human body detection device of the present invention, in which the plurality of infrared-ray emitting devices and the PSD corresponding to the infrared-ray emitting devices are housed in a housing, allows the device size to be smaller than the conventional embodiment shown in FIG. 1 in which a plurality of housings are assembled. Additionally, the cost of the device is reduced by the smaller number of parts.

Since the above-mentioned infrared distance-measuring sensor does not employ mechanical scanning, the sensor has excellent quietness and its response is not restricted by mechanical scanning. Furthermore, maintenance is not required by virtue of the wear-free structure eliminating mechanical scanning. Therefore, the human body detection device is stably operational over a long period.

In one embodiment of the present invention, the position sensing devices have one light receiving surface corresponding to the plurality of the infrared-ray emitting devices.

The expression "a light receiving surface" as used herein means a light receiving surface composed of a continuous material, more particularly composed of one chip.

According to this embodiment, because the position detecting element has one light receiving surface corresponding to a plurality of infrared-ray emitting devices, the human body detection device becomes smaller and less expensive than a case in which it is composed of a plurality of chips.

In one embodiment of the present invention, the device further comprises a body casing in which at least the pyroelectric-type sensor and the infrared distance-measuring sensor are housed, wherein a toroidal lens is arranged at a location on a front surface of the body casing corresponding to the light receiving surface of the position sensing devices.

The expression "a front surface of the body casing" as used herein means a surface which faces a detection range.

According to this embodiment, the human body detection device is provided with a toroidal lens which is arranged corresponding to a light receiving surface of the position sensitive element so that reflected light beams from various directions are appropriately collected to the light receiving surface through the toroidal lens.

In one embodiment of the present invention, the device further comprises an output part for outputting a human body detection signal which indicates a content detected by the pyroelectric-type sensor and the distance-measuring sensor.

Regarding the human body detection device in the present embodiment, an output part outputs a human body detection signal which indicates a content detected by the pyroelectric-type sensor and the distance-measuring sensor. Thus, various equipment is controlled according to presence, a direction and a distance of a human body within a prescribed detection range using the human body detection signal.

In one embodiment of the present invention, the output part transmits the human body detection signal in a form of infrared rays or radio waves.

According to the human body detection device in the present embodiment, since the output part outputs the human body detection signal in the form of infrared rays or radio waves, the human body detection signal is transmitted to various electronic equipment without using electric cables.

In one embodiment of the present invention, the pyroelectric-type sensor is provided in a plurality, and these pyroelectric-type sensors have their detection ranges shifted away from one another.

The human body detection device in the present embodiment is provided with a plurality of the pyroelectric-type sensors whose detection ranges are shifted away from each other, so that the whole detection range is extended.

Furthermore, the detection ranges of the plurality of pyroelectric-type sensors preferably overlap each other. In this case, a rough position of a human body is detected by calculating a comparison result between outputs from the pyroelectric-type sensors whose detection ranges overlap each other.

In one embodiment of the present invention, each infrared-ray emitting device of the infrared distance-measuring sensor intermittently emits the infrared rays in form of short pulses with a long cycle of 0.5 to 1 sec.

Regarding the human body detection device in the present embodiment, the infrared distance-measuring sensor intermittently emits the infrared rays from each infrared-ray emitting device in form of short pulse with a long cycle of 0.5 to 1 sec. Namely, each of the infrared-ray emitting devices is driven at a low duty. Consequently, power consumption of each of the infrared-ray emitting devices is reduced, as compared with the case of driving the infrared-ray emitting devices at a high duty.

It is to be noted that an emitting cycle of 0.5 sec or longer is sufficient with respect to a human body as a detection object, because human body moves relatively slow. However, it is not desirable for the emitting cycle to be longer than 1 sec, since a person as the human body feels inconformity of the response of human body detection device with his actual position.

In one embodiment of the present invention, the device further comprises a control part for lowering infrared-ray emission frequency of remaining infrared-ray emitting devices relative to that of one infrared-ray emitting device corresponding to a direction of the detection object.

Regarding the human body detection device in the present embodiment, once the direction of the detection object is detected, the control part lowers the infrared-ray emission frequency of the infrared-ray emitting devices except a particular one corresponding to a direction of the detection object. Therefore, power consumption of the infrared-ray emitting devices can be reduced by lowering the emission frequency in a direction where the detection object does not exist.

Furthermore, once the direction of the detection object is detected, the control part may control the infrared-ray emitting devices so as to cause only one device corresponding to the direction of the detection object to emit intermittently infrared rays. In this case, power consumption of the infrared-ray emitting devices can be further reduced. Furthermore, if the detection object moves to a new position resulting in reflected light beams from a direction where the object was previously located are not detected, subsequent operations may be returned to former state in which infrared distance-measuring sensor emits infrared rays from each of the infra-red-ray emitting devices.

In one embodiment of the present invention, a body casing of the human body detection device is covered with a resin member having such properties as to restrict transmission of visible rays and permit transmission of infrared rays.

In the present embodiment, a body casing of the human body detection device is covered with a resin member which has infrared ray-transmittable properties and which limits the transmission of visible rays, so that the human body detection device is protected against mechanical shock and staining. This is also desirable for the human body detection device in view of design because the resin member makes the body casing inconspicuous.

In one embodiment of the present invention, the output part transmits the human body detection signal through a public line.

According to the human body detection device in the present embodiment, since the output part outputs the human body detection signal through a public line, various human body detection signals are transmitted to various electronic equipment through a public line.

There is also provided an electronic equipment comprising:

the above human body detection device;

an equipment part for executing prescribed operations; and a control part for controlling the equipment part based on the human body detection signal outputted from the human body detection device.

In the present electronic equipment provided with the human body detection device controls the equipment part based on the human body detection signal outputted from the human body detection device, so that the equipment part is controlled according to presence, a direction and a distance of a human body.

In one embodiment of the present invention, the electronic equipment further comprises a storage part for storing information indicating a user's taste, wherein the control part controls operation of the equipment part based on the information stored in the storage part in addition to the human body detection signal.

According to the electronic equipment in the present embodiment, e.g., information is preliminarily registered in a storage part according to the user's taste. The control part controls the equipment part based on the information preliminarily registered in the storage part, as well as the human body detection signal. Therefore, the equipment part is controlled according to not only presence, a direction and a distance of a human body within a prescribed detection range, but also the user's taste.

Additionally, means for updating a content stored in the storage part in real time during operation of the equipment part is preferably provided with the electronic equipment. In this case, the control of the equipment part is switched according to the user's taste in real time during operation. When there is a plurality of users, the control of the equipment part can be switched for every user in real time during operation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 B is a front view schematically showing the human body detection device;

DETAILED DESCRIPTION OF THE PREFERRED EMBODIMENTS

This invention will be described in further detail by way of preferred embodiments with reference to the accompanying drawings.

Figure 3A:
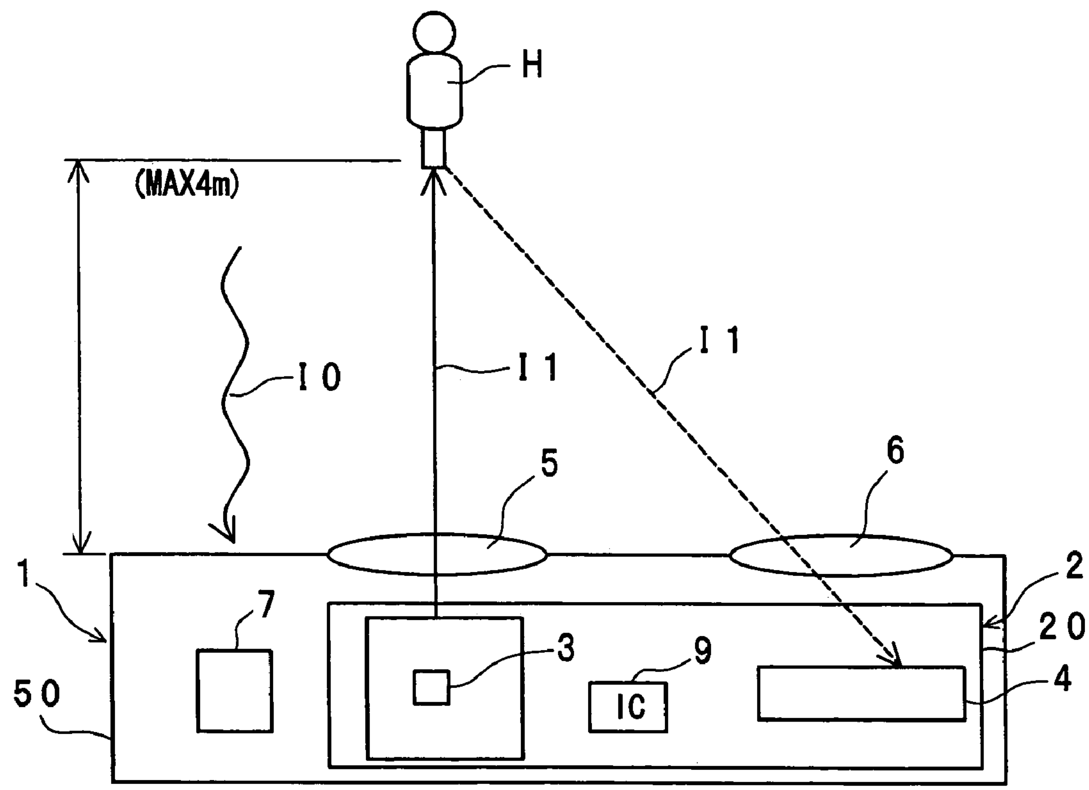
FIG. 3A is an overhead view schematically showing an embodiment of a human body detection device of the present invention.
Figure 3B:
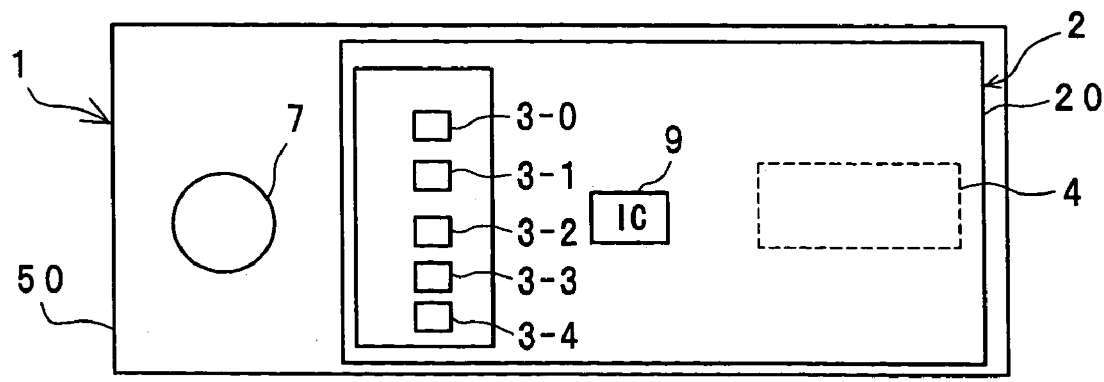
FIG. 3B is a front view schematically showing the human body detection device.

Referring to the drawings, FIG. 3A is an overhead view schematically showing a human body detection device 1 and FIG. 3B is a front view schematically showing the interior construction of the human body detection device 1 according to an embodiment of the present invention. As shown in FIG. 3B, the human body detection device 1 is provided with a pyroelectric-type sensor 7 for detecting the presence of a human body and an infrared distance-measuring sensor 2 for detecting a distance to an object to be measured (a human body) in a body casing 50. The infrared distance-measuring sensor 2 is provided with a plurality (five in this embodiment) of LED chips 3-0, 3-1, 3-2, 3-3, and 3-4 (hereinafter collectively referred to as 3) as an infrared-ray emitting device, a position sensing device (PSD) 4 and an integrated circuit (IC) 9 in a housing 20. As shown in FIG. 3A, converging lenses 5 and 6 are arranged on a front surface of the body casing 50, each of the lenses corresponding to the LEDs 3 and the PSD 4. Near infrared rays I1 emitted from each of the LEDs 3 reach a detection object H through the corresponding converging lens 5, and reflected light beams I1' from the detection object H enter a light receiving surface of the PSD 4 through the converging lens 6. The PSD 4 outputs a signal showing a distance to the detection object H according to the entering position of the reflected light on the light receiving surface. The pyroelectric-type sensor 7 detects heat rays (far infrared rays) emitted from the detection object H.

Figure 6:
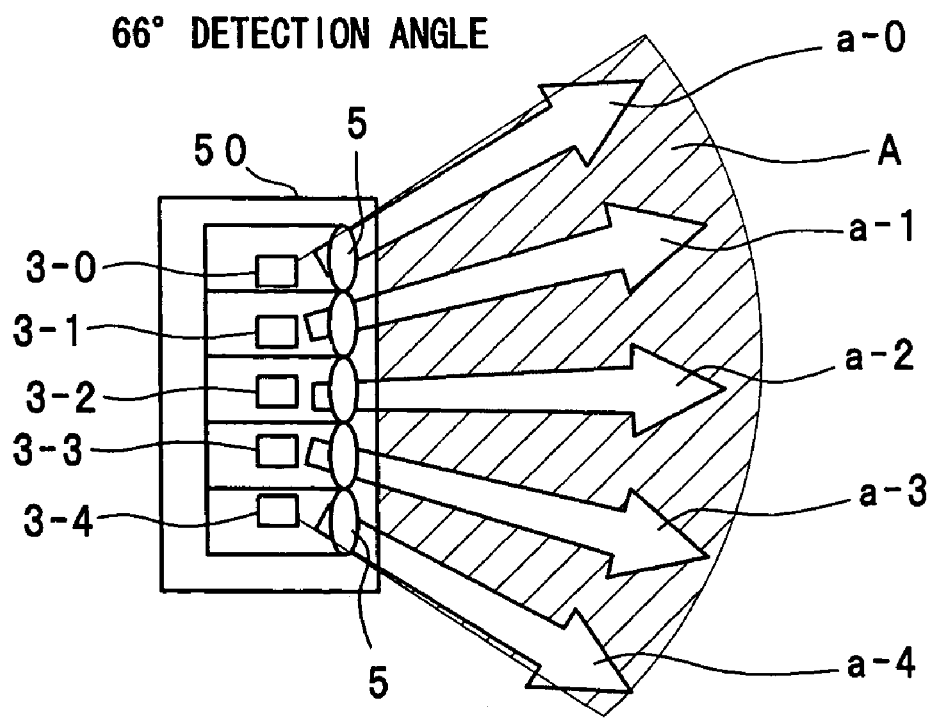
FIG. 6 is a view showing infrared radiation directions emitted from LEDs mounted on the human body detection device.

FIG. 6 is a side elevation view of the human body detection device 1 showing interior thereof. Each of the LED chips 3 are arranged so that the chips can cover a detection range A (shown as shaded) of the pyroelectric-type sensor 7 by changing each emitting direction of the infrared rays (near infrared rays). Arrows a-0, a-1, a-2, a-3 and a-4 show the emitting directions of the infrared rays from the LED chips 3-0, 3-1, 3-2, 3-3, and 3-4, respectively.

Figure 5:
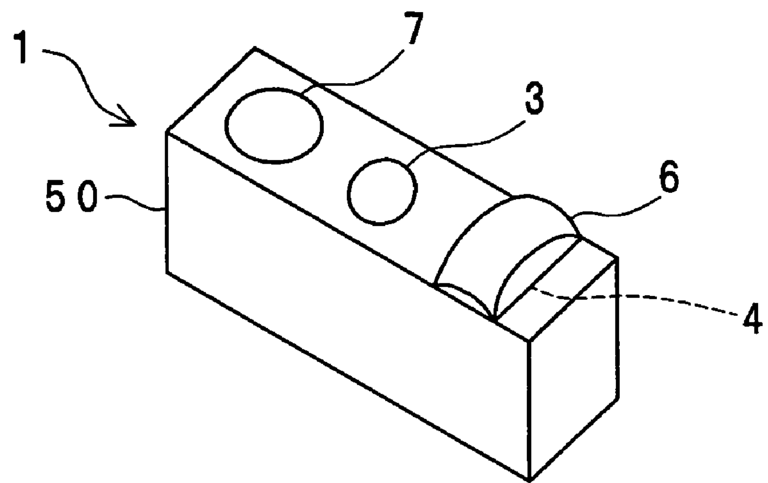
FIG. 5 is a perspective external view of the human body detection device.

FIG. 5 shows a perspective external view of the human body detection device 1. As shown in FIG. 5, a toroidal lens is employed as the converging lens 6 corresponding to the PSD 4. The toroidal lens 6 can appropriately collect reflected light beams from various directions to the light receiving surface of the PSD 4.

Figure 1A:
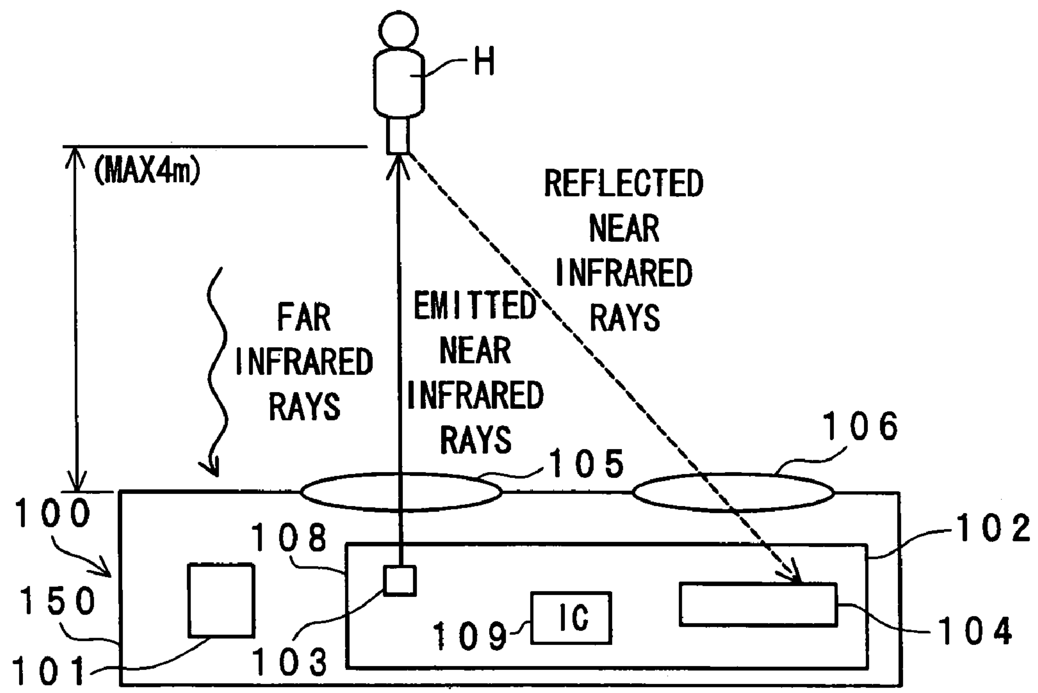
FIG. 1A is an overhead view schematically showing a conventional human body detection device.
Figure 1B:
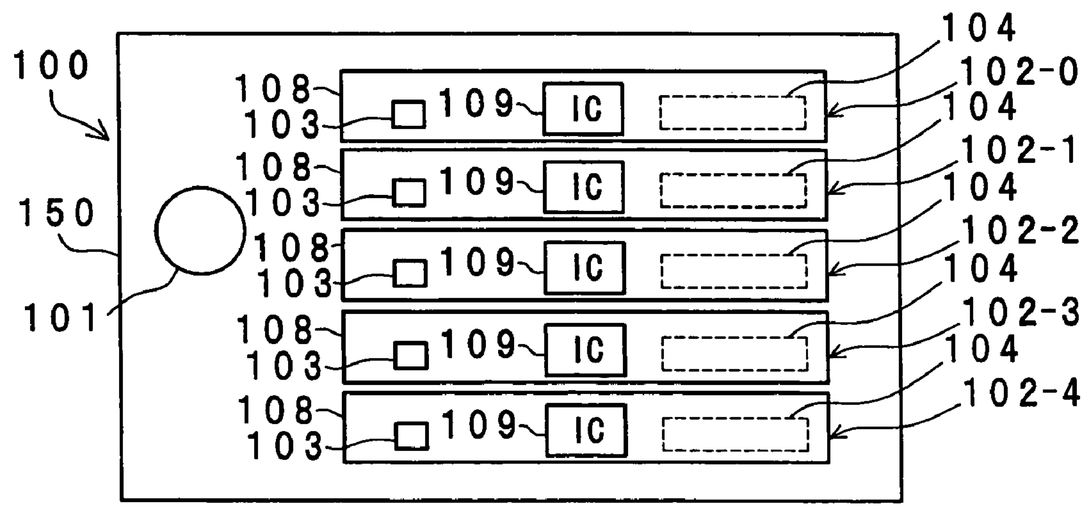
FIG. 1B is a front view schematically showing the conventional human body detection device.
Figure 2:
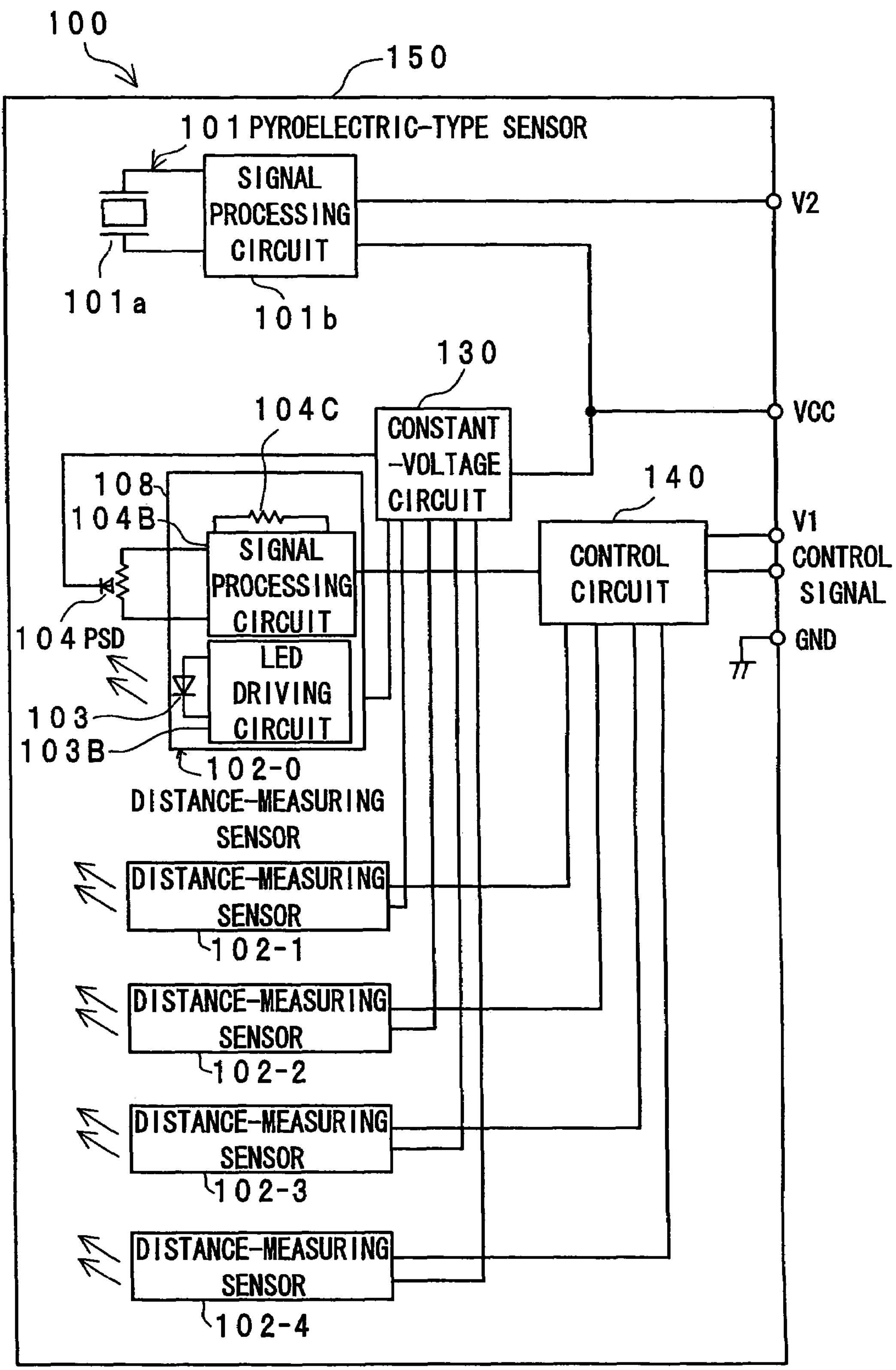
FIG. 2 is an electrical block diagram showing the conventional human body detection device.

The human body detection device 1, in which the PSDs 4 corresponding to a plurality of the LED chips 3 are housed in the housing 20, allows the device size to be smaller than the conventional embodiment shown in FIG. 1 in which a plurality of housings are assembled. More particularly, reduction in size approximate to that of a distance-measuring sensor 102 shown in FIG. 1 can be realized for the human body detection device 1. Additionally, the cost of the device is reduced by virtue of the smaller number of parts.

Figure 4:
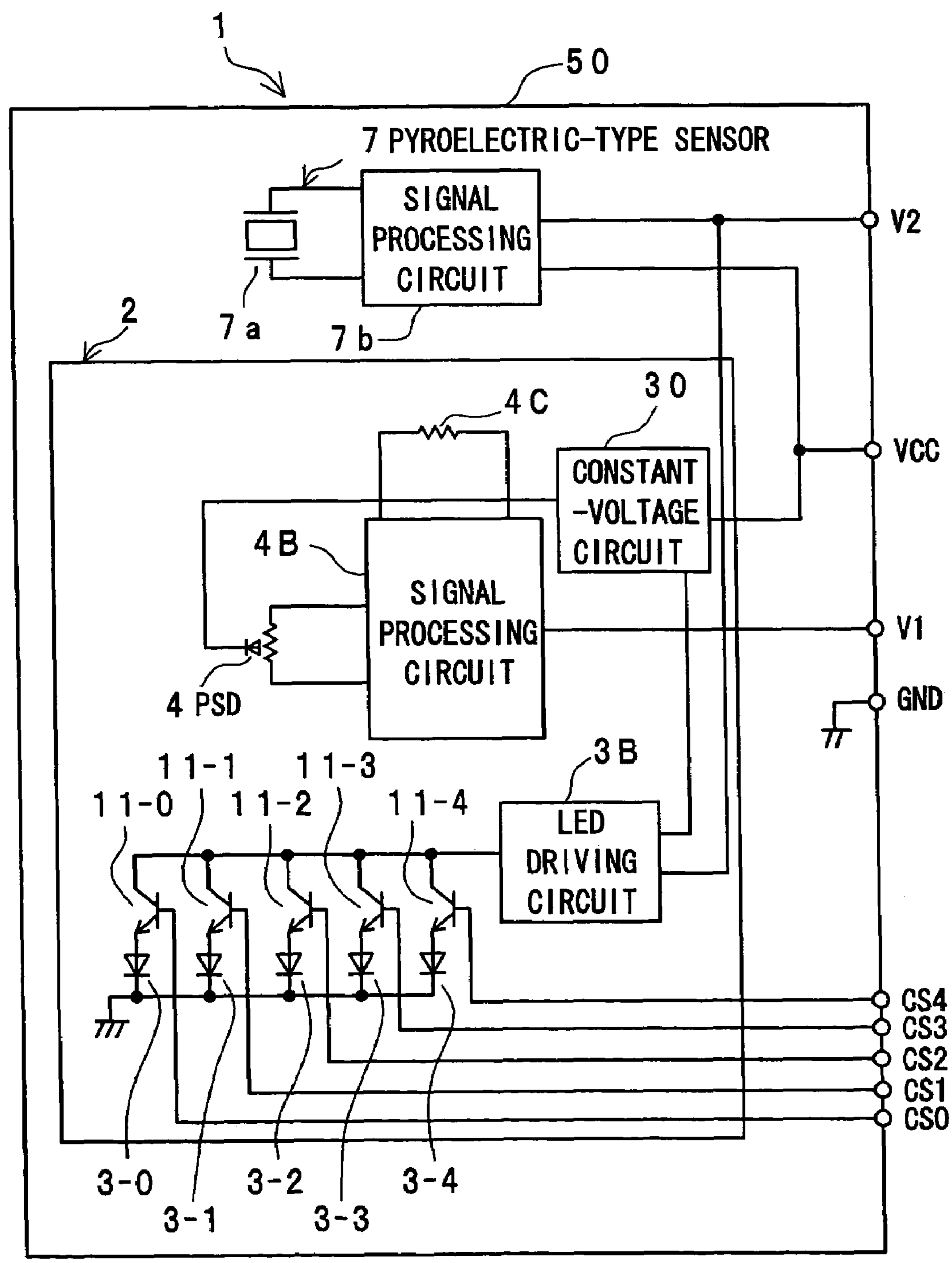
FIG. 4 is an electrical block diagram showing the human body detection device.

FIG. 4 shows an electrical block diagram of the human body detection device 1. As shown in FIG. 4, the pyroelectric-type sensor 7 includes a sensor part 7*a* and a signal processing circuit 7*b* for processing an output from the sensor part 7*a*. The distance-measuring sensor 2 includes an LED driving circuit 3B for driving each of the LEDs 3-0, 3-1, 3-2, 3-3, and 3-4, a signal processing circuit 4B for processing an output from the PSD 4, and a resistor 4C for adjusting sensitivity (3B, 4B and 4C correspond to IC 9 in FIG. 3). NPN transistors 11-0, 11-1, 11-2, 11-3 and 11-4 are provided between the LED driving circuit 3B and each of the LEDs 3-0, 3-1, 3-2, 3-3, and 3-4 as a switch for energizing the LEDs, respectively. The NPN transistors 11-0, 11-1, 11-2, 11-3 and 11-4 are switched on/off by LED control signals CS0, CS1, CS2, CS3 and CS4 from a control part (shown as 40 in FIG. 7A, for example). The distance-measuring sensor 2 is also provided with a constant-voltage circuit 30 for supplying a constant voltage with the LED driving circuit 3B and the PSD 4.

The body casing 50 is provided with a V2 terminal for outputting an output signal from the pyroelectric-type sensor 7, a VCC terminal for supplying power to the signal processing circuit 4B and the constant-voltage circuit 30 from an external power source, a V1 terminal for outputting an output signal from the PSD 4, a GND terminal for grounding the body casing 50 and a terminal for inputting the LED control signals CS0, CS1, CS2, CS3 and CS4.

The human body detection device 1 is operated as follows:

The pyroelectric-type sensor 7 is always set to an operational state. When a detection object (shown as a human body H in FIG. 3A) exists within a prescribed range (a detection range) from the pyroelectric-type sensor 7, the pyroelectric-type sensor 7 detects far infrared rays 10 emitted from the human body, and outputs a detection signal to a V2 terminal. According to the detection signal, a distance measuring operation of the distance-measuring sensor 2 is started by a control of the control part 40.

Figure 13A:
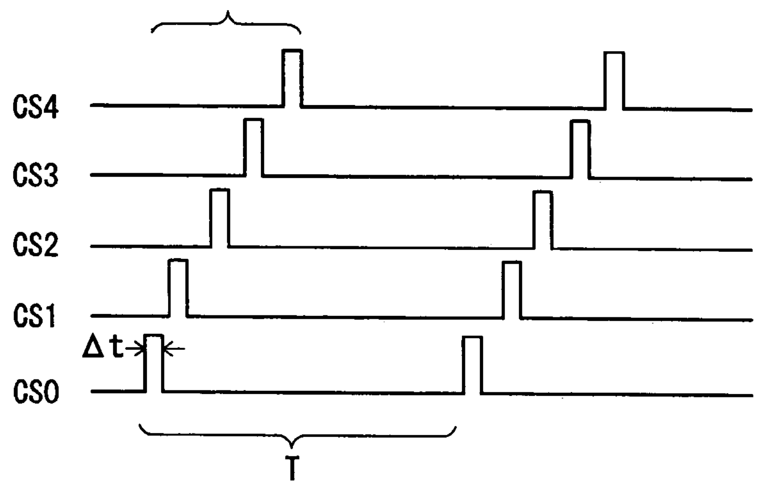
FIG. 13A and FIG. 13B respectively illustrates a waveform of an LED control signal detected by the human body detection device shown in FIG. 3.

For example, in a control timing as shown in FIG. 13A, the control part 40 causes the LED control signals CS0, CS1, CS2, CS3 and CS4 in form of short pulse with a pulse width of Δt to be high level by sequentially delaying their timing with a long cycle T of 0.5 to 1 sec. According to this, NPN transistors 11-0, 11-1, 11-2, 11-3 and 11-4 shown in FIG. 4 are sequentially and temporarily switched on, so that the corresponding LEDs 3-0, 3-1, 3-2, 3-3, and 3-4 sequentially and temporarily emit near infrared rays I1 (this operation is referred to as "sequential control").

Here, when the detection object H shown in FIG. 6 exists within the detection range in a specific direction (one of a-0, a-1, a-2, a-3 and a-4), the infrared rays I1 emitted in the direction are reflected by the detection object H, and the reflected light beams I1' from the detection object H enter the light receiving surface of the PSD 4. Therefore, a direction where the detection object exists can be detected by the control part 40. The control part 40 detects the output signal from the distance-measuring sensor 2 (the V1 terminal) synchronizing with the LED control signals CS0, CS1, CS2, CS3 and CS4, namely with infrared rays emitted from each of the LEDs 3-0, 3-1, 3-2, 3-3, and 3-4. In addition, the distance to the detection object is shown as an output from the distance-measuring sensor 2 based on a position of the reflected light beams on the light receiving surface. Thus the human body detection device can detect not only presence of a human body but also a distance and a direction of a human body.

As described above, driving the LEDs 3 at a low duty can reduce power consumption of each of the LEDs, as compared with the case of driving the LEDs at a high duty. It is to be noted that an infrared ray emitting cycle T of 0.5 sec or longer is sufficient to detect the distance, because human body movement is relatively slow. However, it is not desirable for the emitting cycle T to be longer than 1 sec, since a person as the human body feels inconformity of the response of human body detection device with his actual position.

Figure 13B:
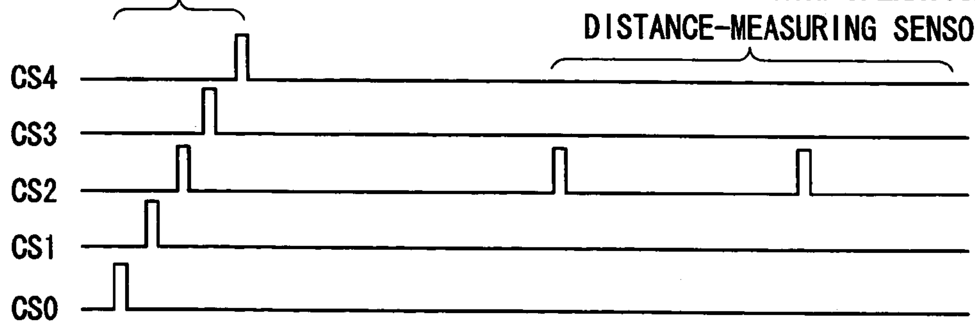

It is to be noted that, in the above embodiment, the LEDs 3-0, 3-1, 3-2, 3-3, and 3-4 sequentially and temporarily emit infrared rays (sequential control), however the human body detection device of the present invention is not limited to this. As shown in FIG. 13B, the control part 40 may emit intermittently infrared rays from a particular one of the LEDs which corresponds to a direction of the detection object H (LED 3-2 corresponding to the control signal CS2 in this embodiment), once the direction of the detection object H is detected by a series of operations of the distance-measuring sensor 2. In this case, when only the LED 3-2 is maintained its emitting cycle T, power consumption of the LEDs can be reduced to one-fifth of the above embodiment.

Furthermore, if the detection object H moves to a new position resulting in reflected light beams from the previous location are not detected, subsequent operations is returned to the sequential control shown in FIG. 13A.

Thus, power consumption of the LEDs as a whole can be reduced by lowering the infrared-ray emission frequency of the LEDs 3-0, 3-1, 3-2, 3-3 and 3-4 of the distance-measuring sensor 2, except a particular one corresponding to the direction of the detection object H.

Figure 7A:
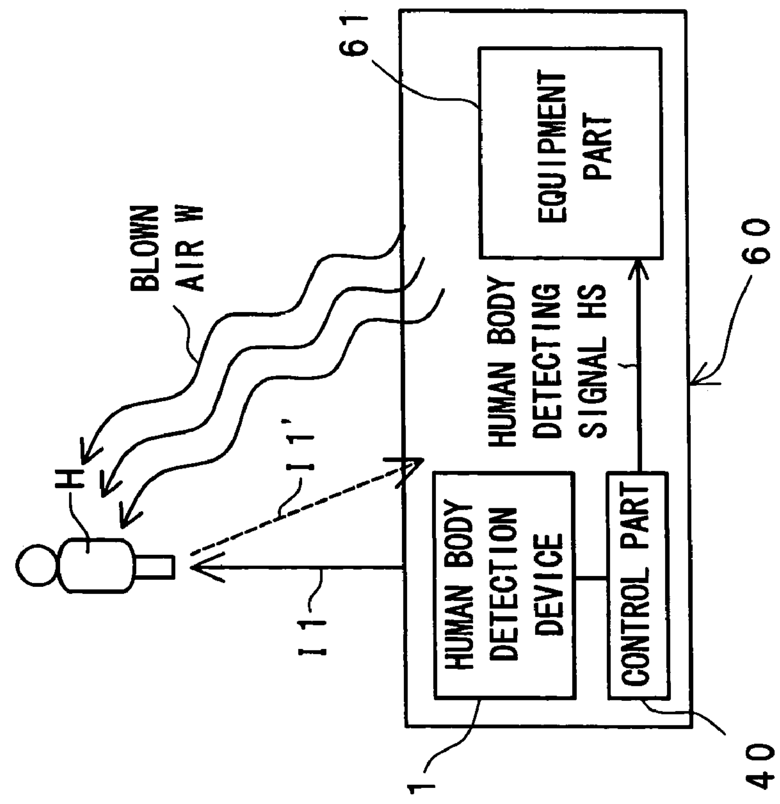
FIG. 7A is a view showing an application of the human body detection device for an air conditioner.

FIG. 7A shows an embodiment in which the human body detection device 1 and the control part 40 integrated in one body are mounted on an air conditioner 60 as electronic equipment. The air conditioner 60 is provided with a equipment part 61 for blowing a conditioned air W into a room. In the air conditioner 60, the control part 40 functions as an output part for outputting a human body detection signal HS indicating a content detected by the pyroelectric-type sensor 7 and the distance-measuring sensor 2. Subsequently, the control part 40 controls the equipment part 61 based on the human body detection signal HS, so that a blown air W is controlled according to presence, a direction and a distance of a human body in a room (within a detection range). For example, air conditioning in a room is effectively achieved by blowing a cooling or warming air in a direction where the detection object exists.

Figure 7B:
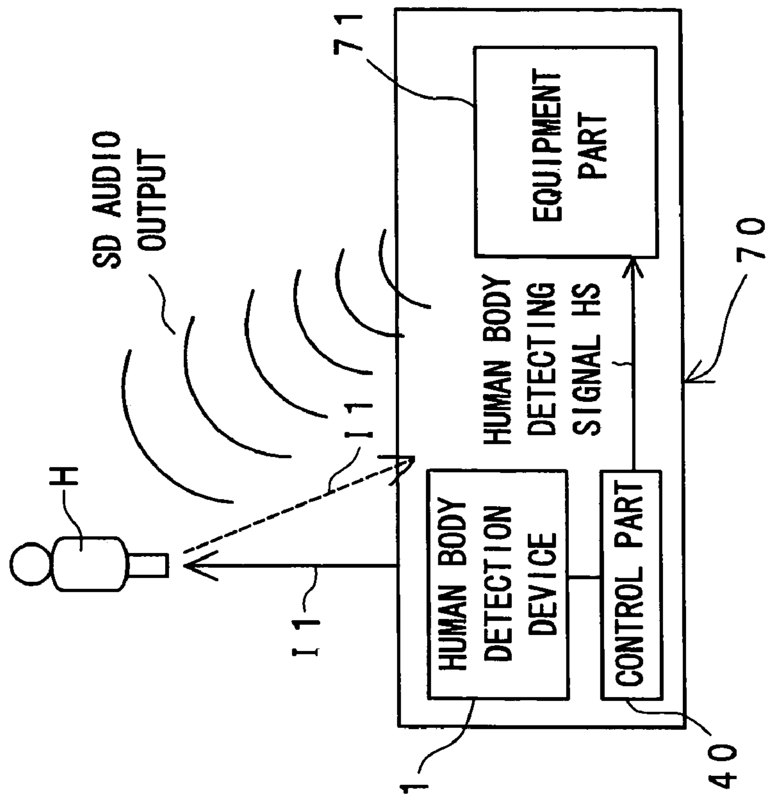
FIG. 7B is a view showing application of the human body detection device for an audio equipment.

FIG. 7B shows an embodiment in which the human body detection device 1 and the control part 40 integrated in one body are mounted on a unit of audio equipment 70 as electronic equipment. The audio equipment 70 is provided with a equipment part 71 for performing audio output SD in a room. In the audio equipment 70, the control part 40 controls the equipment part 71 based on the human body detection signal HS, so that an audio output SD is controlled according to presence, a direction and a distance of a human body in a room (within a detection range). For example, sound effect from a speaker set of the equipment part 71 is automatically adjusted so that sound quality can be best at a position where a human exists.

Figure 8:
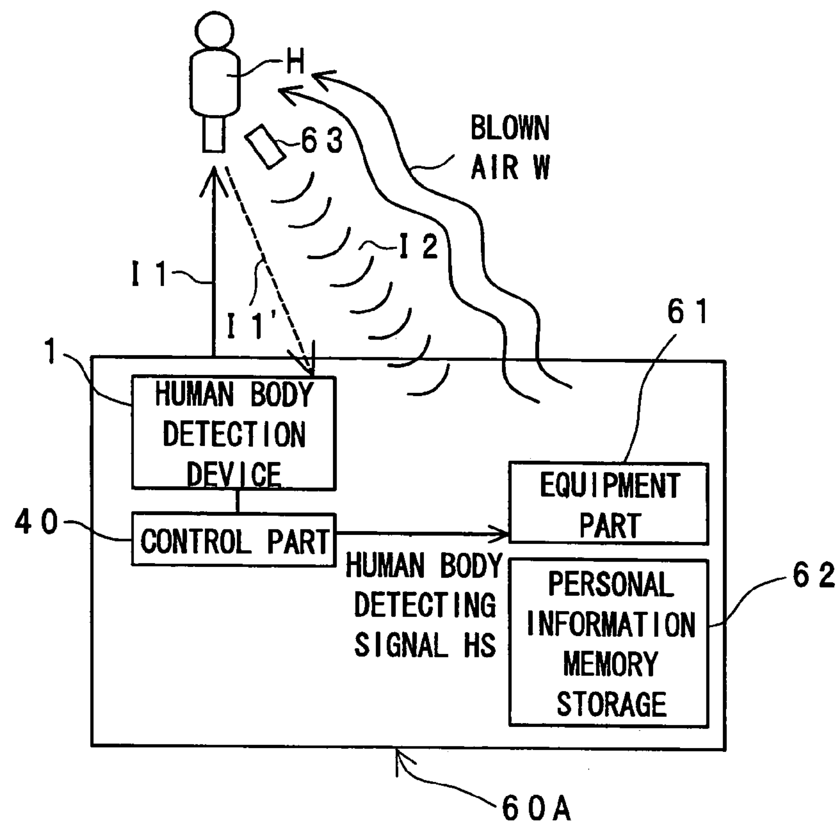
FIG. 8 illustrates a modified example of the embodiment shown in FIG. 7A for an air conditioner.

FIG. 8 illustrates a modified embodiment 60A in which a personal information storage device 62 as a storage part is mounted on the air conditioner 60 shown in FIG. 7. The personal information storage device 62 stores information indicating a user's taste, which means a room temperature and a flow rate of blown air in this embodiment.

For example, if the number of users to be detected is one, information on a room temperature, a flow rate of blown air is preliminarily registered in the personal information storage device 62 according to the user's taste. When the air conditioner is operated, the control part 40 controls the equipment part 61 based on the information preliminarily registered in the personal information storage device 62, as well as the human body detection signal HS. Therefore, the equipment part 61 is controlled according to not only presence, a direction and a distance of a human body in a room (within the detection range), but also the user's taste, so that an air conditioning according to the user's taste, i.e., a conditioned air of his preferred temperature and flow rate is realized.

Furthermore, if the number of users to be detected is two or more, the air conditioner executes a precedent operation for specifying an individual H using means such as a voice-detecting device and a display device. Responding to the precedent operation, the individual H transmits the information for specifying himself to the air conditioner 60A using a voice or a remote controller 63 for sending out an infrared signal 12. Responding to the information transmitted by the individual, the air conditioner 60A updates a storage content stored in the personal information storage device 62 in real time during operation. The control part 40 controls the equipment part 61, based on not only presence, a direction and a distance of a human body in a room, but also the real-time updated storage content stored in the personal information storage device 62. In this embodiment where the number of users to be detected is two or more, the control of the equipment part 61 is switched for every user in real time during operation, resulting in users' convenience being improved.

Figure 9:
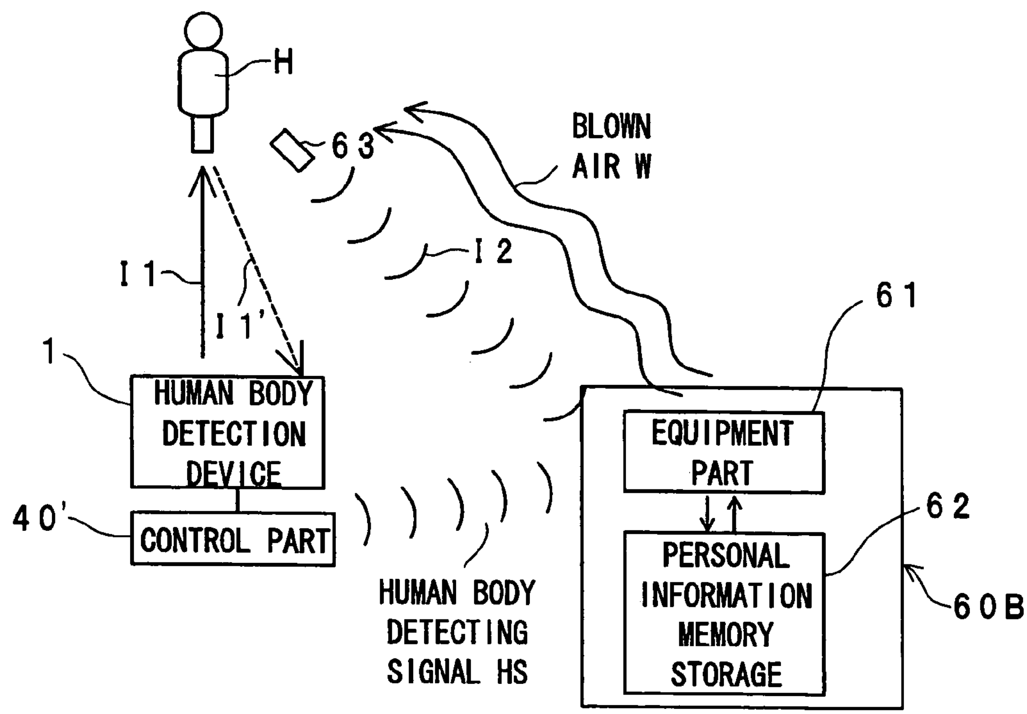
FIG. 9 illustrates an embodiment in which the human body detection device is installed in a different location from that of the air conditioner.

FIG. 9 illustrates an embodiment in which the human body detection device 1 and the control part 40' integrated in one body are installed in a location different from that of the air conditioner 60B (on a wall, for example). In this embodiment, the control part 40' as an output part transmits the human body detection signal HS in the form of infrared rays or radio waves (shown as HS'). In this case, the human body detection signal HS' is transmitted to the air conditioner 60B without using electric cables.

Figure 10A:
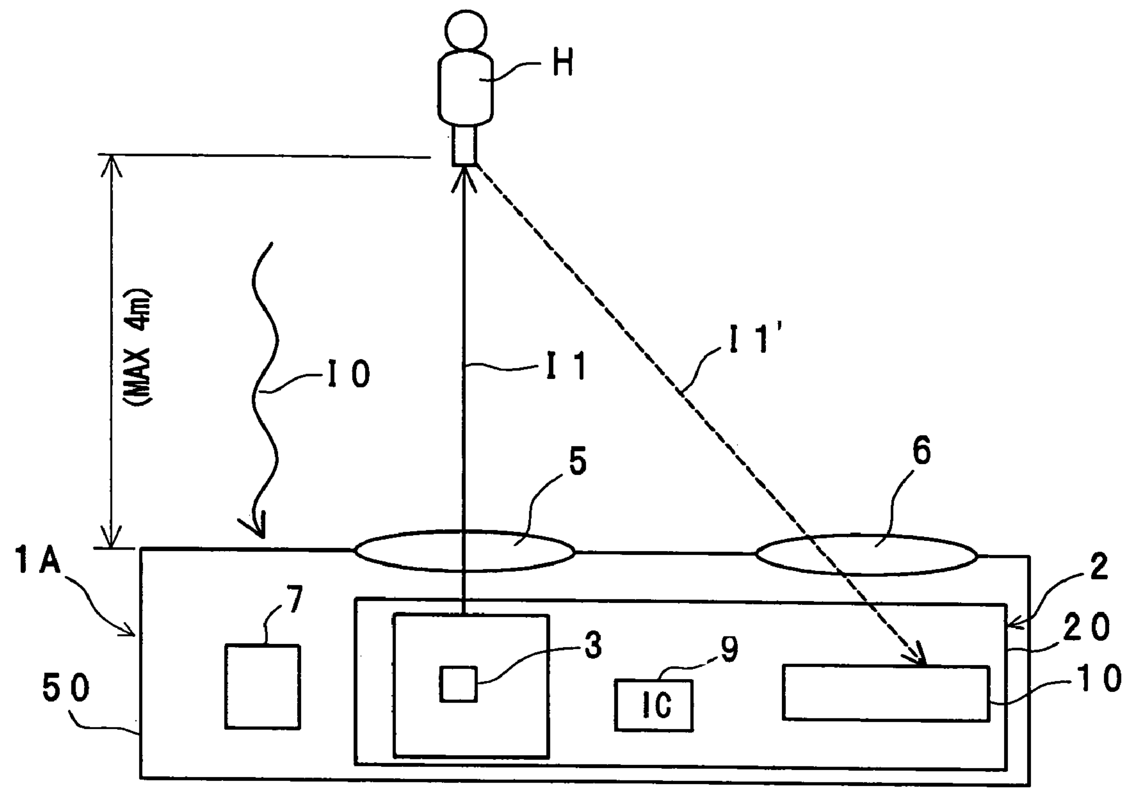
FIG. 10 A illustrates a modified embodiment of the human body detection device shown in FIG. 3.
Figure 10B:
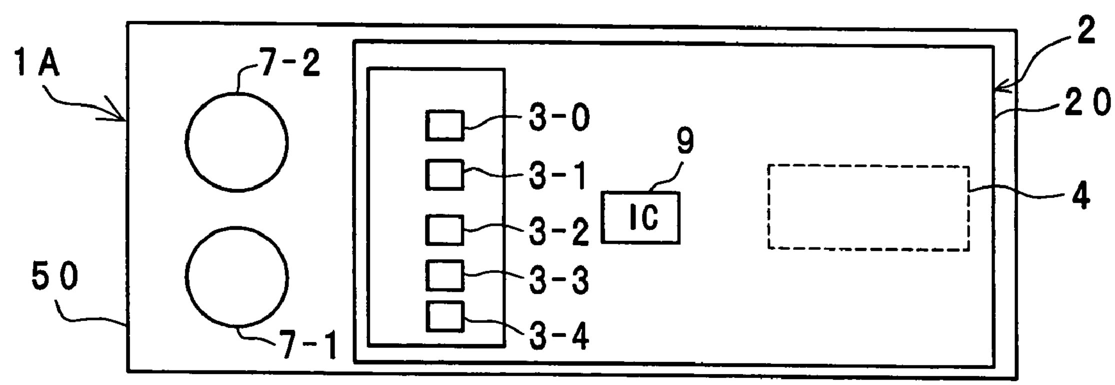

FIG. 10A is a side view schematically showing a modified embodiment of the human body detection device 1 (shown as 1A), and FIG. 10B is a front view schematically showing the interior construction of the human body detection device 1A. The human body detection device 1A has the same structure as that shown in FIG. 3A and FIG. 3B except that the human body detection device 1A is provided with two pyroelectric-type sensors 7-1 and 7-2.

Figure 11:
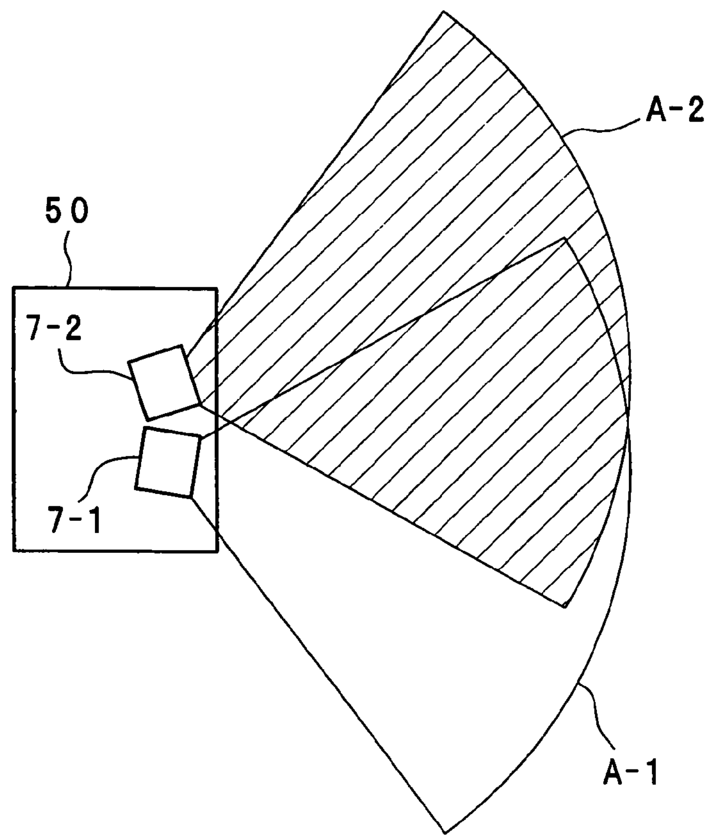
FIG. 11 illustrates a detection range of pyroelectric-type sensors mounted on the human body detection device.

FIG. 11 is an overhead view schematically showing the interior construction of the human body detection device 1A. Since a pyroelectric-type sensor 7-1 directing to the right and a pyroelectric-type sensor 7-2 directing to the left are installed, detection ranges of the pyroelectric-type sensors A-1 and A-2, respectively, are vertically shifted away from each other. Thus the whole detection range is extended. Furthermore, the detection ranges A-1 and A-2, which overlap each other, detect a rough position of a human body by calculating a comparison result between the both outputs from the pyroelectric-type sensors 7-1 and 7-2.

Figure 12:
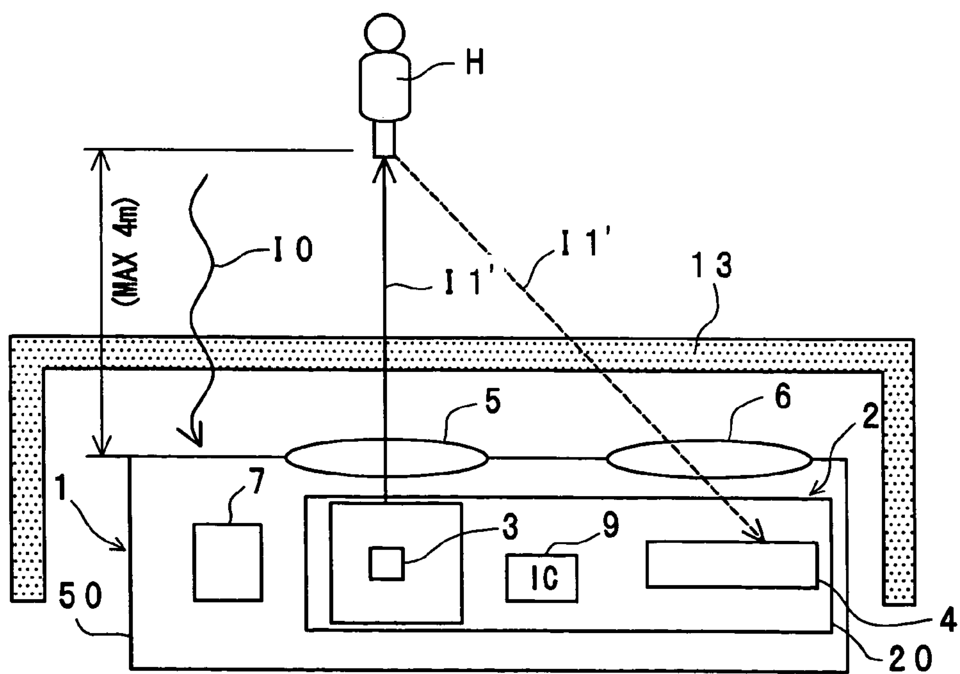
FIG. 12 illustrates an embodiment in which the human body detection device shown in FIG. 3 is covered with a resin member.

FIG. 12 illustrates an embodiment in which a body casing 50 of the human body detection device 1 is covered with a resin member 13 which has infrared ray-transmittable and visible ray-limiting properties. This allows the human body detection device 1 to be protected against mechanical shock and staining. Therefore, the installation place of the human body detection device 1 is advantageously less restricted by virtue of the protection. The installation place of the human body detection device is also advantageously less restricted in view of design, because the resin member 13 makes the body casing 50 of the human body detection device 1 inconspicuous.

Figure 14A:
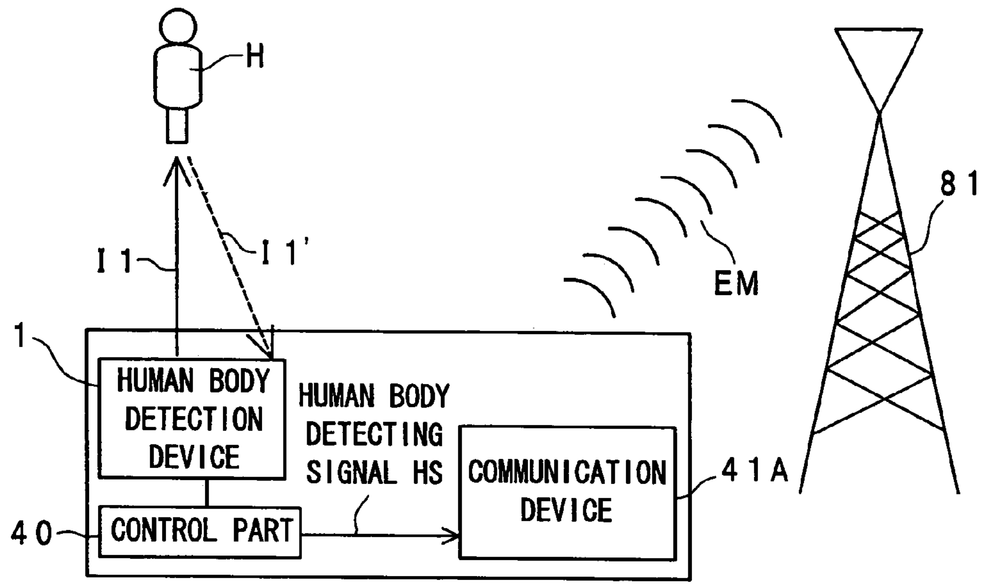
FIG. 14A and FIG. 14B respectively illustrate an embodiment in which a communication device are additionally provided with the human body detection device and a control part.
Figure 14B:
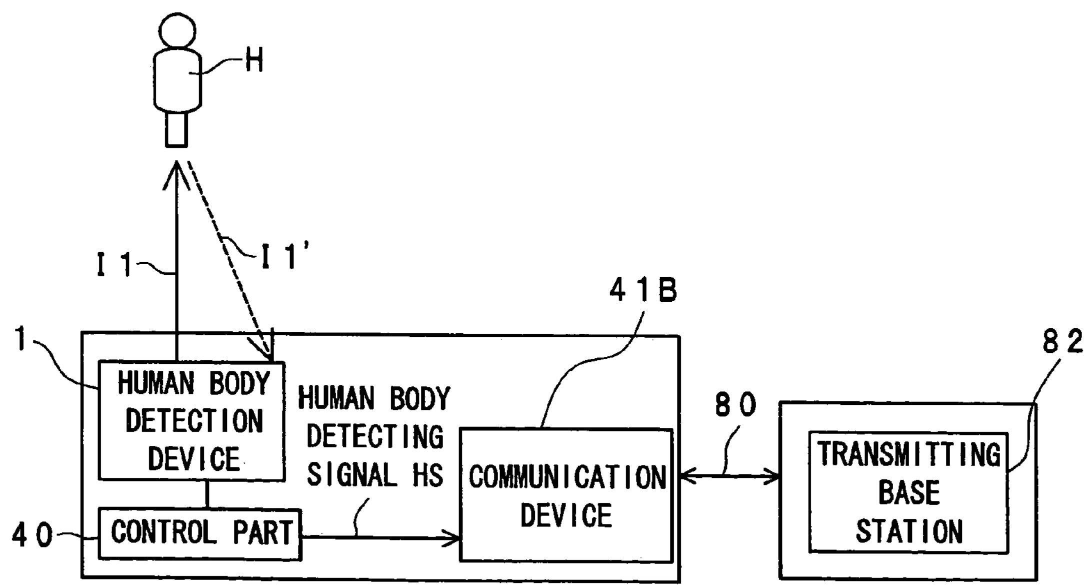

FIG. 14A and FIG. 14B illustrate an embodiment in which a communication device 41A (41B) is provided with the human body detection device 1 and a control part 40 integrated in one body. The communication device as an output part transmits the human body detection signal HS wirelessly and through a public line, respectively. In an embodiment shown in FIG. 14A, the communication device 41A outputs the human body detection signal HS wirelessly in the form of radio waves to a relay 81. In an embodiment shown in FIG. 14B, the communication device 41B outputs the human body detection signal HS to a transmitting base station 82 via cables 80.

In the embodiment described above, information on presence and movement of a human body located at a remote place is easily and inexpensively acquired by electronic equipment for receiving the, human body detection signal HS. Although image data communication by an image pickup device is frequently employed for detailed monitoring of a remote place, but this is economically disadvantageous due to an exclusive line and a power source for transmitting generally large amount of image data generated by the image pickup device. In contrast, the embodiment above is economically advantageous because a data amount detected by the pyroelectric-type sensor 7 and the distance-measuring sensor 2 is small resulting in the data being transmitted through a public line without facilities such as an exclusive line and a power source described above.

In an ordinary supervisory task, which requires continuous monitoring, changes such as coming in or going out of person are detected using an image pickup element and the human body detection device in combination. Therefore, the present invention greatly reduces burden on facilities and human resources by transmitting image data only when a change is detected.

Although in the above embodiments, the control parts 40 and 40' and the communication devices 41A and 41B are provided outside the body casing 50 of the human body detection device 1, the present invention is not limited to this. A control part and an output part may be provided in an integrated form inside the body casing 50 of the human body detection device 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A human body detection device comprising:

a pyroelectric-type sensor configured to output a signal upon detecting presence of a human body;

an infrared distance-measuring sensor configured to detect a distance to the human body in response to receipt of the output signal from pyroelectric-type sensor; and a body casing in which at least the pyroelectric-type sensor and the infrared distance-measuring sensor are housed, the infrared distance-measuring sensor including:

a plurality of infrared-ray emitting devices which are arranged in various directions of infrared emission so as to cover a detection range of the pyroelectric-type sensor; and a position sensing device which has one light receiving surface corresponding to the plurality of the infrared-ray emitting devices for making infrared rays reflected by the human body incident thereon and which outputs a signal indicating a distance to the human body according to a position of the incident light on the light receiving surface, wherein the position sensing device is housed in one housing, and a toroidal lens is arranged at a location on a front surface of the body casing corresponding to the light receiving surface of the position sensing devices.

2. The human body detection device as set forth in claim 1, further comprising an output part for outputting a human body detection signal which indicates a content detected by the pyroelectric-type sensor and the distance-measuring sensor.

3. The human body detection device as set forth in claim 2, wherein the output part transmits the human body detection signal in a form of infrared rays or radio waves.

4. The human body detection device as set forth in claim 1, wherein the pyroelectric-type sensor is provided in a plurality, and these pyroelectric-type sensors have their detection ranges shifted away from one another.

5. The human body detection device as set forth in claim 1, wherein each infrared-ray emitting device of the infrared distance-measuring sensor intermittently emits the infrared rays in form of short pulses with a long cycle of 0.5 to 1 sec.

6. The human body detection device as set forth in claim 1, further comprising a control part for lowering infrared-ray emission frequency of remaining infrared-ray emitting devices relative to that of one infrared-ray emitting device corresponding to a direction of the detection object.

7. The human body detection device as set forth in claim 1, wherein a body casing of the human body detection device is covered with a resin member having such properties as to restrict transmission of visible rays and permit transmission of infrared rays.

8. The human body detection device as set forth in claim 2, wherein the output part transmits the human body detection signal through a public line.

9. An electronic equipment comprising:

the human body detection device as set forth in claim 2;

an equipment part for executing prescribed operations; and a control part for controlling the equipment part based on the human body detection signal outputted from the human body detection device.

10. The electronic equipment as set forth in claim 9, further comprising a storage part for storing information indicating a user's taste, wherein the control part controls operation of the equipment part based on the information stored in the storage part in addition to the human body detection signal.

* * * * *